US008818030B2

(12) United States Patent
Wang et al.

(10) Patent No.: US 8,818,030 B2
(45) Date of Patent: Aug. 26, 2014

(54) POST-PROCESSING A MULTI-SPECTRAL IMAGE FOR ENHANCED OBJECT IDENTIFICATION

(75) Inventors: Yao Rong Wang, Webster, NY (US); Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 379 days.

(21) Appl. No.: 13/324,368

(22) Filed: Dec. 13, 2011

(65) Prior Publication Data

US 2013/0148847 A1 Jun. 13, 2013

(51) Int. Cl.
*G06K 9/00* (2006.01)

(52) U.S. Cl.
USPC .......................................... 382/103; 382/224

(58) Field of Classification Search
CPC ....................................................... G06K 9/62
USPC ................... 382/103, 173, 180, 164
See application file for complete search history.

(56) References Cited

U.S. PATENT DOCUMENTS

| | | | | |
|---|---|---|---|---|
| 4,850,025 | A * | 7/1989 | Abe | 382/220 |
| 4,905,294 | A * | 2/1990 | Sugiura et al. | 382/180 |
| 5,111,411 | A * | 5/1992 | Browne | 382/141 |
| 5,734,747 | A * | 3/1998 | Vaidyanathan | 382/170 |
| 5,767,978 | A * | 6/1998 | Revankar et al. | 358/296 |
| 5,784,488 | A * | 7/1998 | Kuwata | 382/176 |
| 5,995,668 | A * | 11/1999 | Corset et al. | 382/233 |
| 6,507,670 | B1 * | 1/2003 | Moed | 382/172 |
| 6,643,400 | B1 * | 11/2003 | Murakawa et al. | 382/195 |
| 6,731,801 | B2 * | 5/2004 | Murakawa et al. | 382/180 |
| 6,922,485 | B2 * | 7/2005 | Hirata | 382/164 |
| 7,218,759 | B1 * | 5/2007 | Ho et al. | 382/118 |
| 7,236,629 | B2 * | 6/2007 | Cooper et al. | 382/171 |
| 7,469,060 | B2 * | 12/2008 | Bazakos et al. | 382/173 |
| 7,657,090 | B2 * | 2/2010 | Omatsu et al. | 382/173 |
| 7,929,756 | B2 * | 4/2011 | Curti et al. | 382/165 |
| 8,306,325 | B2 * | 11/2012 | Chang | 382/176 |
| 8,587,657 | B2 * | 11/2013 | Wang et al. | 348/148 |
| 2004/0017938 | A1 * | 1/2004 | Cooper et al. | 382/171 |
| 2005/0063565 | A1 * | 3/2005 | Nagaoka et al. | 382/104 |

(Continued)

OTHER PUBLICATIONS

Wang, et al., "Determining A Total Number of People In An IR Image Obtained Via An IR Imaging System", U.S. Appl. No. 12/967,775, filed Dec. 14, 2010.

(Continued)

*Primary Examiner* — Gandhi Thirugnanam
(74) *Attorney, Agent, or Firm* — Philip E. Blair; Fleit Gibbons Gutman Bongini & Bianco P.L.

(57) ABSTRACT

A system and method for post-processing a multi-spectral image which has already been processed for pixel classification. A binary image is received which contains pixels that have been classified using a pixel classification method. Each pixel in the image has an associated intensity value and has a pixel value of 1 or 0 depending on whether the pixel has been classified as a material of interest or not. The image is divided into a plurality of blocks of pixels. On a block by block basis, pixel values in a block are changed according to a threshold-based filtering criteria such that pixels in the same block all have the same binary value. Once all the blocks have been processed, contiguous pixels having the same binary value are grouped to form separate objects. In such a manner, pixel classification errors in the post-processed binary image can be reduced.

21 Claims, 14 Drawing Sheets

(56) References Cited

U.S. PATENT DOCUMENTS

| | | | |
|---|---|---|---|
| 2005/0271275 A1* | 12/2005 | Chang | 382/176 |
| 2008/0069427 A1* | 3/2008 | Liu et al. | 382/137 |
| 2008/0187225 A1* | 8/2008 | Katsuyama | 382/190 |
| 2009/0067666 A1* | 3/2009 | Zhao et al. | 382/100 |
| 2012/0147194 A1* | 6/2012 | Wang et al. | 348/164 |
| 2012/0200682 A1* | 8/2012 | Mestha et al. | 348/61 |
| 2012/0262577 A1* | 10/2012 | Wang et al. | 348/148 |
| 2012/0320433 A1* | 12/2012 | Xie et al. | 358/474 |
| 2013/0148847 A1* | 6/2013 | Wang et al. | 382/103 |
| 2013/0148904 A1* | 6/2013 | Wang et al. | 382/224 |
| 2013/0235178 A1* | 9/2013 | WANG et al. | 348/77 |
| 2013/0301898 A1* | 11/2013 | Jain et al. | 382/133 |

OTHER PUBLICATIONS

Wang et al., "Determining A Number Of Objects In An IR Image", U.S. Appl. No. 13/086,006, filed Apr. 13, 2011.

Mestha et al., "Method For Classifying A Pixel Of A Hyperspectral Image In A Remote Sensing Application", U.S. Appl. No. 13/023,310, filed Feb. 8, 2011.

* cited by examiner

POST-PROCESSING A MULTI-SPECTRAL IMAGE FOR ENHANCED OBJECT IDENTIFICATION

CROSS REFERENCE TO RELATED CASES

This case is related to commonly owned U.S. Pat. No. 8,457,415, entitled: "Post-Processing A Multi-Spectral Image For Enhanced Object Identification", to Wang et al.

TECHNICAL FIELD

The present invention is directed to methods for post-processing a multi-spectral image which has been pre-processed via a pixel classification method such that objects in the image are more correctly identified.

BACKGROUND

While methods which classify pixels in an infrared image correctly classify most pixels, incorrect classifications are still assigned to some pixels when the source image was captured using a multi-band imaging system. With information such as, for instance, the illumination spectrum, windshield transmittance, filter transmittance, detector response, and the reflectance of a known material, a theoretical camera intensity for a pixel of that material in the image can be calculated. By correlating the captured camera intensity with the theoretical camera intensity for that material, a pixel can be classified as being that material or not. Theoretically, pixels can be classified correctly. However, in reality, many pixels are wrongly classified due to non-uniform lighting, background fluctuation, and objects such as a shadow. FIG. 15 shows a binary image which has been pixel-classified as to skin using a correlation coefficient method of pixel classification. The binary image of FIG. 15 was generated using a threshold for the correlation coefficient of 0.94 and assigning a value of 1 to a pixel if the correlation coefficient for that pixel was greater than 0.94, and assigning a value of 0 to that pixel if the correlation coefficient was less than 0.94. As shown, many pixels have been wrongly classified as correlating to human skin. As such, post-processing of a pixel-classified binary image is needed to reduce pixel classification error.

Accordingly, what is needed in this art are sophisticated systems and methods for post-processing a multi-spectral image which has already been processed for pixel classification so that the objects in the image can be properly identified and extracted.

INCORPORATED REFERENCES

The following U.S. patents, U.S. patent applications, and Publications are incorporated herein in their entirety by reference.

"Determining A Total Number Of People In An IR Image Obtained Via An IR Imaging System", U.S. patent application Ser. No. 12/967,775, by Wang et al, which discloses a ratio method for classifying pixels in an IR image.

"Determining A Number Of Objects In An IR Image", U.S. patent application Ser. No. 13/086,006, by Wang et al, which discloses a correlation method and a best fitting reflectance method for classifying pixels in an IR image.

"Method For Classifying A Pixel Of A Hyperspectral Image In A Remote Sensing Application", U.S. patent application Ser. No. 13/023,310, by Mestha et al.

BRIEF SUMMARY

What is disclosed is a system and method for post-processing a multi-spectral image which has been processed for pixel classification so that objects in the image can be properly identified. Disconnected small areas of pixels are filtered using the methods disclosed herein. The present method is intended to be used as an adjunct to pixel classification methods when an image is captured using a multiband imaging system. In such a manner, a more accurate pixel classification is effectuated.

One embodiment of the present method for determining objects in an image captured with a multi-band infrared imaging system involves the following. First, a binary image is received which contains pixels that have been classified using a pixel classification method. Each pixel in the image has an associated intensity value. Each of the pixels has a pixel value of 1 or 0 depending on whether the pixel is classified as a material of interest or not. The image is divided into a plurality of blocks of pixels. The image is then manipulated by changing values of pixels in each block according to a threshold-based filtering criteria such that all pixels in a given block have a binary value which is uniform throughout the entire block. Thereafter, contiguously connected pixels all having the same binary value are grouped to form objects. Each of the pixel groups being determined to comprise a separate object in the image.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a system and method for post-processing a multi-spectral image which has been processed for pixel classification so that objects in the image can be identified and extracted.

NON-LIMITING DEFINITIONS

A "material of interest", as used herein, refers to a material which pixels in an image have been classified as comprising. Example materials of interest are human tissue (hair, skin, etc.), plastics, metals, composite materials, and the like. The list of materials that may be of interest will depend on the environment where the teachings hereof find their implementations. Such environments may be, for instance, an airport, a courthouse, a government office building, a vehicle occupancy detection system, to name a few. In one embodiment, pixels which have been classified as being a material of interest are assigned a value of 1. Otherwise, pixels are assigned a value of 0. In such a manner, the source image is processed, via pixel classification, into a binary image.

Figure 1:
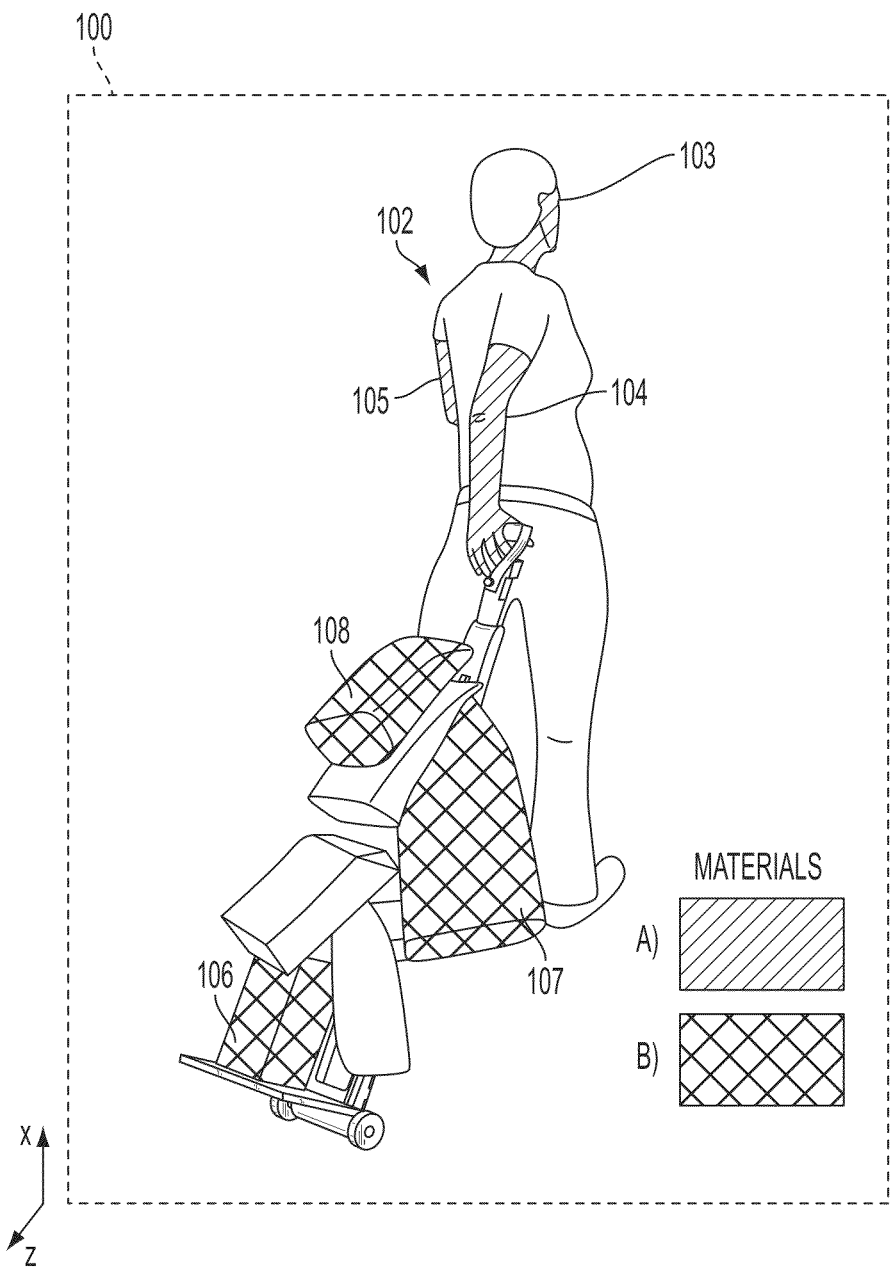
FIG. 1 shows an example image captured of a person in an airport pulling a wheeled carrying device loaded with packages.

A "binary image" is an image containing pixels which have been classified using a pixel classification method. FIG. 1 illustrates an example image 100 captured using a multi-band IR imaging system showing a person 102 pulling a wheeled luggage carrying device containing an assortment of packages. For explanatory purposes, the materials of interest for pixel classification purposes were human skin tissue and a plastic such as PET, HDPE or LDPE. In the pixel-classified image of FIG. 1, pixels of facial region 103, right arm portion 104, and left arm portion 105 will be classified as pixels which have been identified as a material of interest, i.e., skin tissue (material 'A'). Pixels of packages 106, 107 and 108, will be classified as pixels which have been identified as a material of interest, i.e., the type of plastic (material 'B'). Upon classification, each pixel will have been assigned a value of 1 if the pixel belongs to one of the materials of interest and a value of 0 otherwise. In such a manner, the original image is transformed into a binary image by having been processed using a pixel classification technique. It should be appreciated that any numeric value can be assigned to a pixel which has been classified as a material of interest. For example, assume that pixels in a given image have been identified as each of 3 different materials of interest. In this instance, one set of pixels of a first object identified as belonging to a first material of interest may be assigned a value of 1, while pixels of a second object identified as belonging to a second material of interest may be assigned the value of 2, and pixels of a third object identified as belonging to a third material of interest may have been assigned a value of 3. In this case, the binary image would be comprised of pixels identified as materials of interest would have respective assigned values of 1, 2 and 3, and pixels in the image which do not belong to any of the materials of interest would have a value of 0. Such alternative embodiments are intended to fall within the scope of the appended claims.

Figure 2:
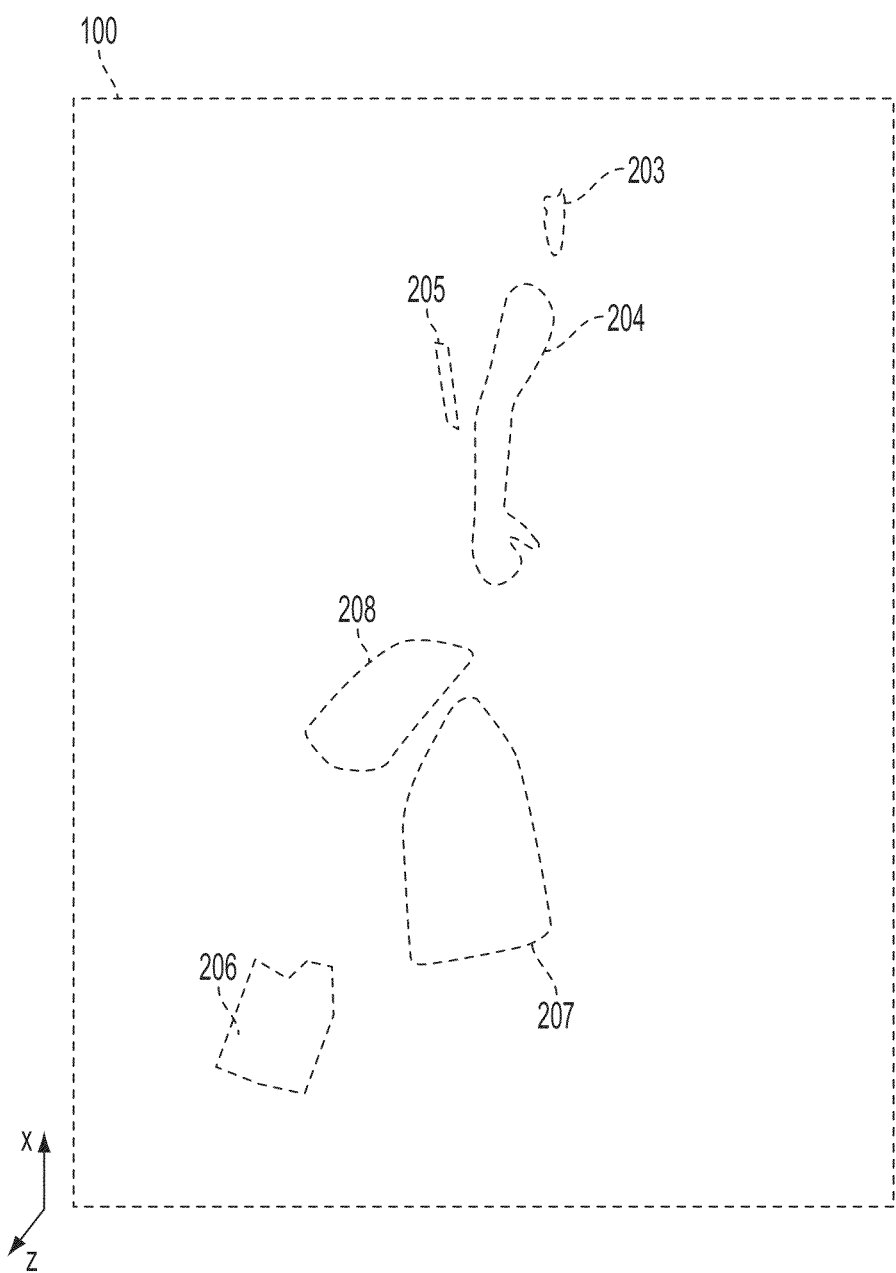
FIG. 2 shows various formed objects by having grouped pixels of the objects of interest identified in FIG. 1.

A "formed object" is an object formed by grouping together contiguously connected pixels which all have the same binary value as a result of having been classified as a material of interest. Grouped pixels are shown by way of example in FIG. 2 wherein object 203 was formed by grouping together contiguous pixels of skin segment 103. Likewise, objects 204 and 205 were formed in a similar manner by grouping together pixels of skin segments 104 and 105, respectively. All of these pixels are contiguous and all have been assigned the same binary value because each has been classified as human tissue. Similarly, objects 206, 207 and 208 were formed by grouping together contiguous pixels classified as a material of interest, i.e., plastic, and thus all have the same binary value.

Figure 3:
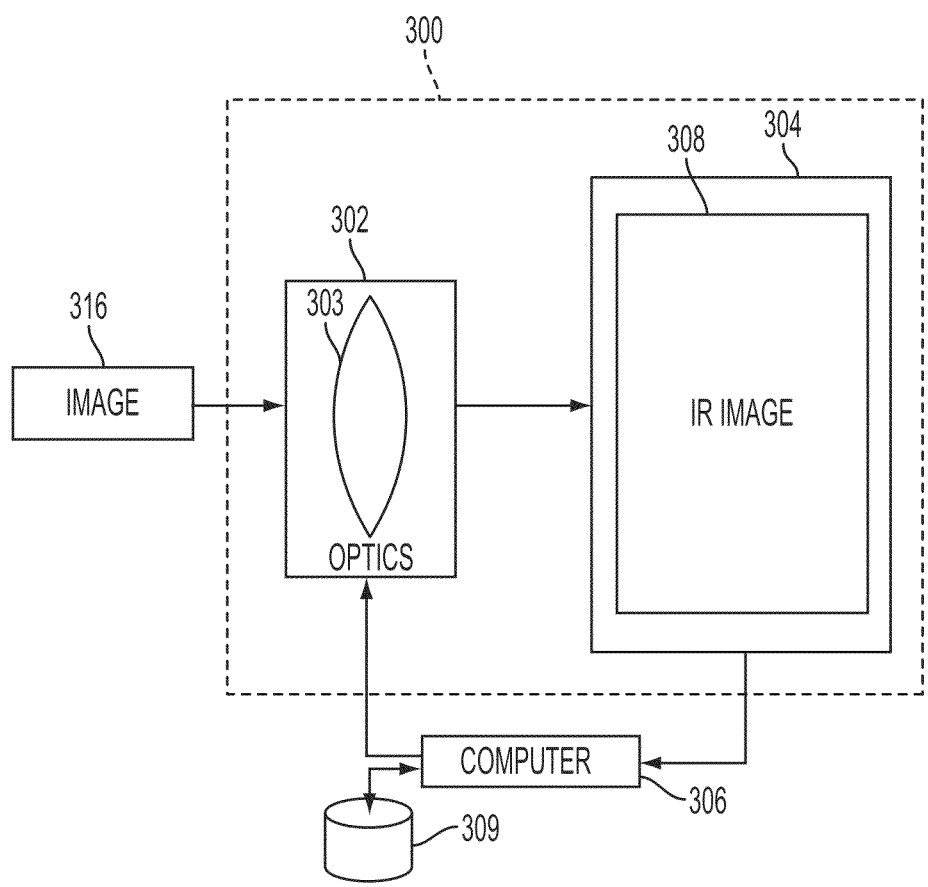
FIG. 3 illustrates one example IR detection system 300.
Figure 4:
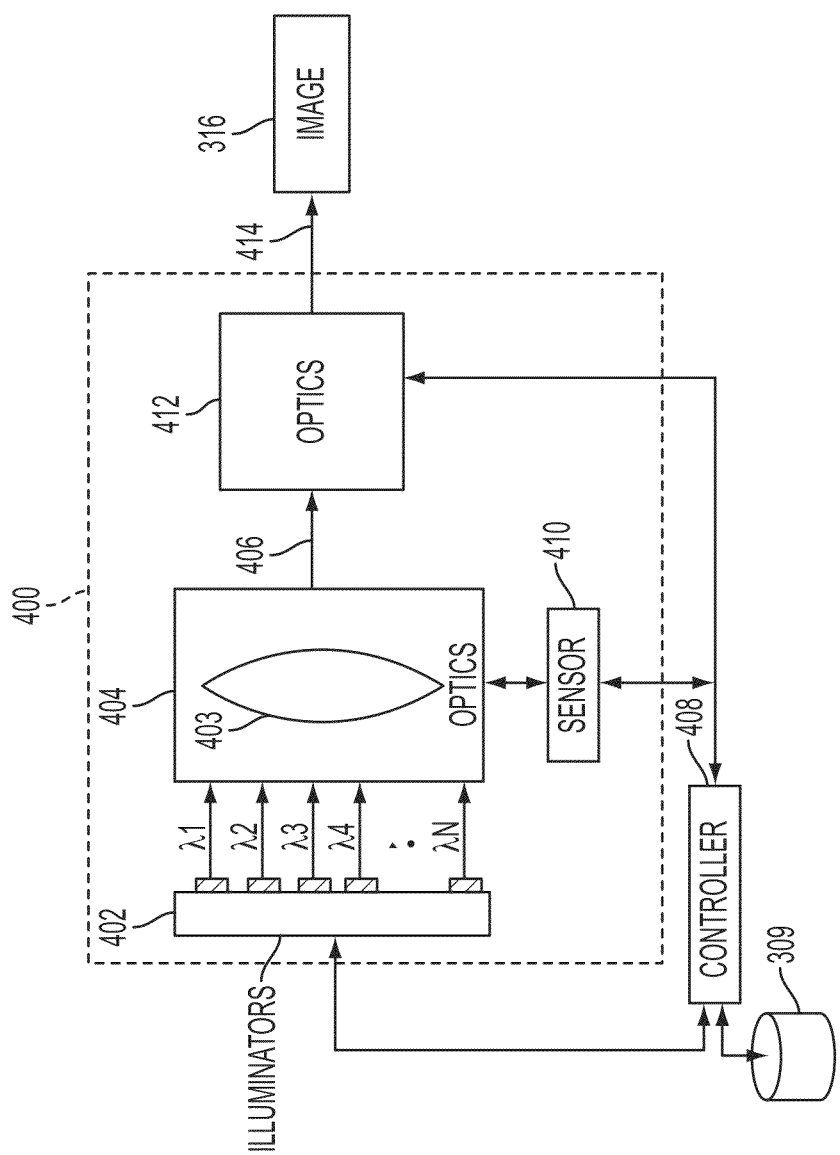
FIG. 4 illustrates one example IR illumination system 400.

An "IR imaging system" is an apparatus comprising an IR illuminator and an IR detector designed to capture IR light reflected from a target, separate it into its component wavelengths, and output an IR image of that target. The IR image is captured over multiple wavelength bands of interest. An IR imaging system can be either a single IR detector and a sequentially illuminated N-band illuminator (N≥3) with one fixed filter, or comprise a total of N detector (N≥3) each having a respective band pass filter and a single illuminator. An example IR detection system is shown in FIG. 3. An example IR illumination system is shown in FIG. 4.

A "Correlation Method" refers to a method of pixel classification wherein pixels of an IR image are classified as human tissue based upon an amount of correlation between a captured intensity of that pixel and a (scaled) intensity calculated from a model. The correlation method using a materials spectra database containing pre-measured reflectances of known materials such as human skin and hair, and other materials of interest. The database includes the transmittance of windshield glass, the power spectra of the IR illuminator(s), the filter transmittances, and a responsivity curve of the IR detector(s). A theoretical pixel intensity for each object in the image is calculated and the measured intensity of each pixel compared with the theoretical intensities to determine an amount of correlation there between. If the intensity of a pixel agrees with the measured intensity of the pixel of a known object, then the correlation will be high (close to 1). Otherwise, the correlation will be low (close to 0 or negative). Pixels are classified based upon a comparison with a threshold value.

A "Ratio Method" is a pixel classification method classifies a pixel as human tissue vs. other materials if the ratio is larger or smaller than a predetermined threshold value.

Figure 5:
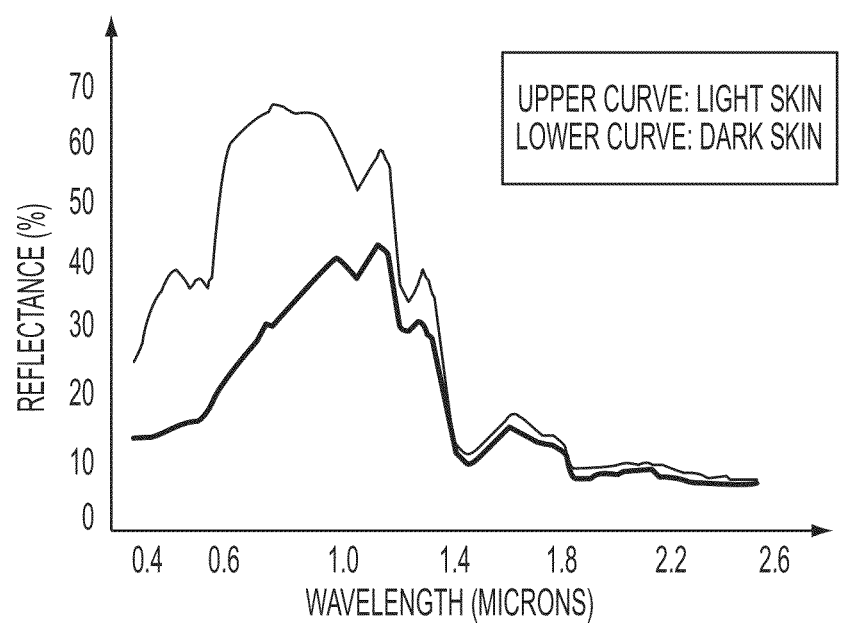
FIG. 5 plots reflectance values vs. wavelengths for human skin.

A "Best Fitting Reflectance Method" is a pixel classification method wherein each pixel in the IR image is processed and classified based upon a best fitting reflectance by cross-referencing measured pixel reflectances with reflectances of known materials in a materials spectral database and determining a best fitting reflectance. FIG. 5 shows reflectances for human skin tissue. One materials spectral database is the High-Resolution Transmission Molecular Absorption Database (HITRAN) maintained by the Atomic and Molecular Physics Division of the Harvard-Smithsonian Center for Astrophysics. HITRAN is downloadable from Harvard's website.

Example IR Detector

Reference is now being made to FIG. 3 which illustrates one embodiment of an example IR detection system 300 for use in accordance with the teachings hereof.

Image 316 reflects the IR output beam 414 emitted by focusing optics 412 of the IR illumination system of FIG. 4. A portion of the reflected IR light is received by optics 302 having lens 303 that focus the received light onto sensor(s)

304 which spatially resolves the received light to obtain IR image 308. Optics 302 may also include one or more bandpass filters that only allow light in a narrow wavelength band to pass though the filter. The filters may also be sequentially changed to obtain N intensities at 308. Sensor 304 sends the IR image information to computer 306 for processing and storage. Detector 308 is a multispectral image detection device whose spectral content may be selectable through a controller (not shown). Detector 304 records light intensity at multiple pixels locations along a two dimensional grid. Optics 302 and detector 304 include components commonly found in various streams of commerce. Suitable sensors include charge-coupled device (CCD) detectors, complementary metal oxide semiconductors (CMOS) detectors, charge-injection device (CID) detectors, vidicon detectors, reticon detectors, image-intensifier tube detectors, pixelated photo-multiplier tube (PMT) detectors, InGaAs (Indium Gallium Arsenide), Mercury Cadmium Telluride (MCT), and Microbolometer. Computer 306 is in communication with optics 302 to control the lens thereof and is in communication with detector 304 to control the sensitivity thereof. Computer 306 receives sensitivity values associated with each pixel of IR image 308. Computer 306 includes a keyboard, monitor, printer, etc. (not shown) as are necessary to effectuate a control of various elements of IR detection system 300.

Example IR Illuminator

Reference is now being made to FIG. 4 which illustrates one embodiment of an example IR illumination system 400 for use in accordance with the teachings hereof.

The IR illumination system of FIG. 4 is shown comprising a plurality of IR light sources 402 each emitting a narrow band of IR radiation at a respective peak wavelength ($\lambda_1, \ldots, \lambda_n$). Light source 402 is an array of light emitting diodes (LEDs). Each diode is pre-selected to emit radiation at a particular wavelength band of interest, and defines a source in the array for that wavelength band. Controller 108 is coupled to source array 402 and controls the input current to each illuminator and, thereby, the output intensity of each. Sensing optics 404 has optics 403 which combine the wavelengths to produce IR illumination beam 406. Sensor 410 samples the radiation emitted from the array of IR light sources and provides feedback to controller 408. Focusing optics 412 receives beam 406 and focuses output beam 414 onto image 316. Optics 412 includes a plurality of lens of varying focal lengths positioned in the beam path to focus the beam as desired. Controller 408 is also coupled to optics 412 to effectuate changes in output beam 414 due to target size, target distance, target speed, to name a few constraints. Controller 408 is in communication with storage device 309 to store/retrieve calibration information, intensity levels, and the like, including data and machine readable program instructions. Controller 408 may comprise a computer system such as a desktop, laptop, server, mainframe, and the like, or a special purpose computer system such as an ASIC. Controller 408 may be placed in wired or wireless communication with a computing workstation over a network. Such a network may be a local area network (LAN) or the Internet. It should be appreciated that any of the components of IR illumination system 400 may be placed in communication with such a computing system to facilitate the intended purposes hereof.

Any of the optics described with respect to IR illumination system 400 of FIG. 4 can be replaced with an optical system having optical power and may further include mirrors. Such an optical system may include multiple components each having optical power, e.g., it may be doublet or a triple lens. In the limit that such optical systems define a unique focal length F, the source array and grating would be positioned in the front and back focal planes of the optics. As a result, the optical system images the grating at infinity with respect to each element of the light source array and thus each source element sees the same region of the grating. The light from each element would be coextensive on that region. The grating can then produce output radiation whose spectral content is substantially uniform across its transverse profile by compensating for the dispersion associated with lateral position of the different wavelength band sources. This, in turn, allows the spectral content of output beam 414 to be substantially uniform across its transverse profile. In practice, it may be difficult to precisely define a desired focal length for the optical system because of aberrations (e.g., field curvature, axial chromatic, lateral chromatic, distortion, coma, and the like), which may cause the optics to focus rays to slightly different positions according to their wavelength or their lateral positioning. In addition, the relative positions of the optical system, the source array, and the grating, are selected according to the more general condition that the optical system images the grating at infinity with respect to each source element of the light source array, at least for paraxial rays that emerge from each source.

Flow Diagram of One Example Embodiment

Figure 6:
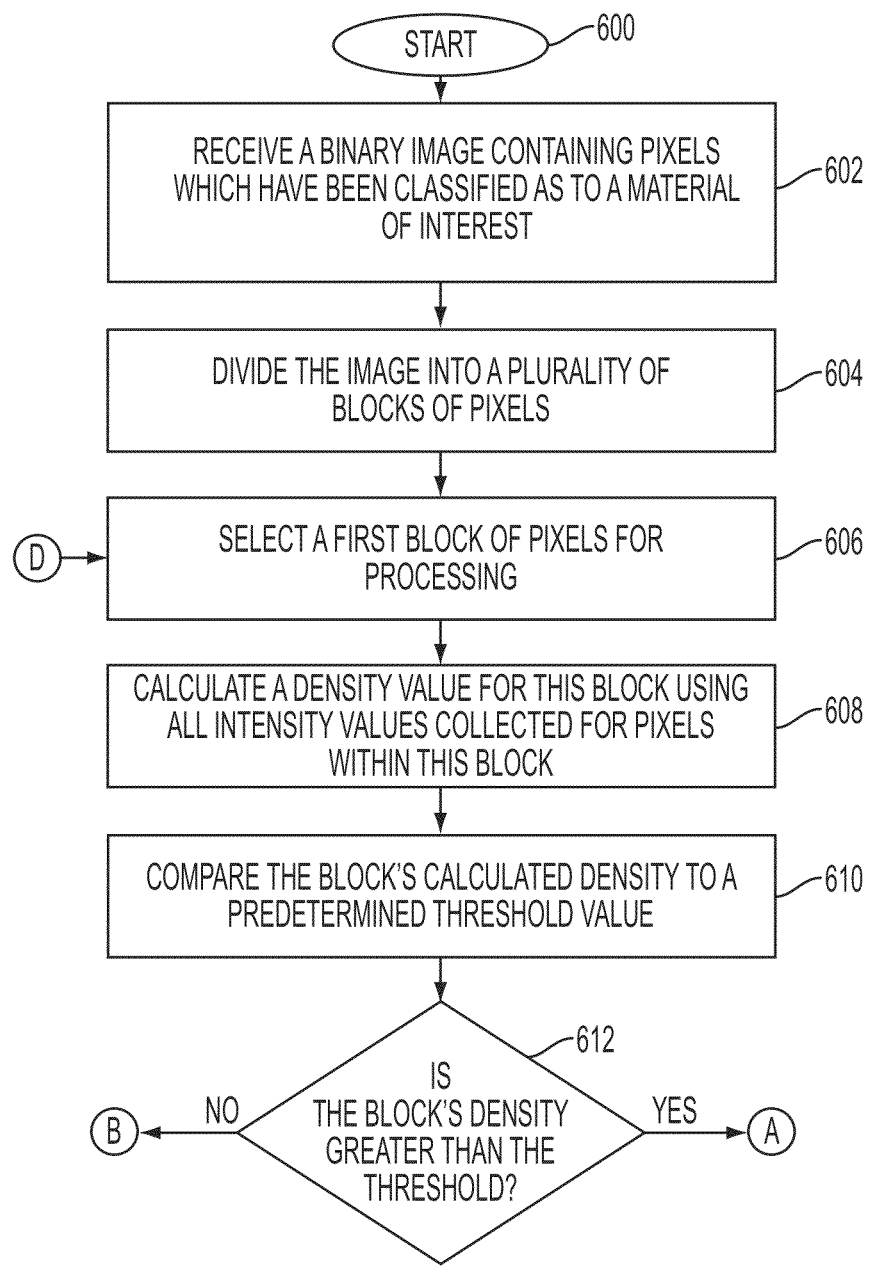
FIG. 6 is a flow diagram of one example embodiment of the present method for determining objects in an image captured with a multi-band imaging system.

Reference is next being made to the flow diagram of FIG. 6 which illustrates one example embodiment of the present method for determining objects in an image captured with a multi-band imaging system. Flow processing starts at 600 and immediately proceeds to step 602. In this embodiment, pixels in the binary image have been classified according to two materials of interest, i.e., human tissue and plastic, and thus have all been assigned a binary value of 1. Pixels in the image which were not classified as being either material of interest have been assigned a value of 0. If the pixels in the pixel-classified binary image have been assigned different binary values such as, for instance, a value of 1 for pixels classified as human tissue, and a value of 2 for pixels classified as plastic, then the present method would have to be repeated once to post-process the image to isolate blobs of pixels which have been classified as human tissue, and again to post-process the image to isolate blobs of pixels which have been classified as plastic.

At step 602, a binary image containing pixels which have been classified using a pixel classification method is received. The source image was captured using an IR imaging system and then processed for pixel classification according to a correlation method, a ratio method, or a best fitting reflectance method. Each pixel in the image has an associated intensity value and each pixel has a pixel value of 1 or 0 depending on whether that pixel was classified as being a material of interest or not.

Figure 8:
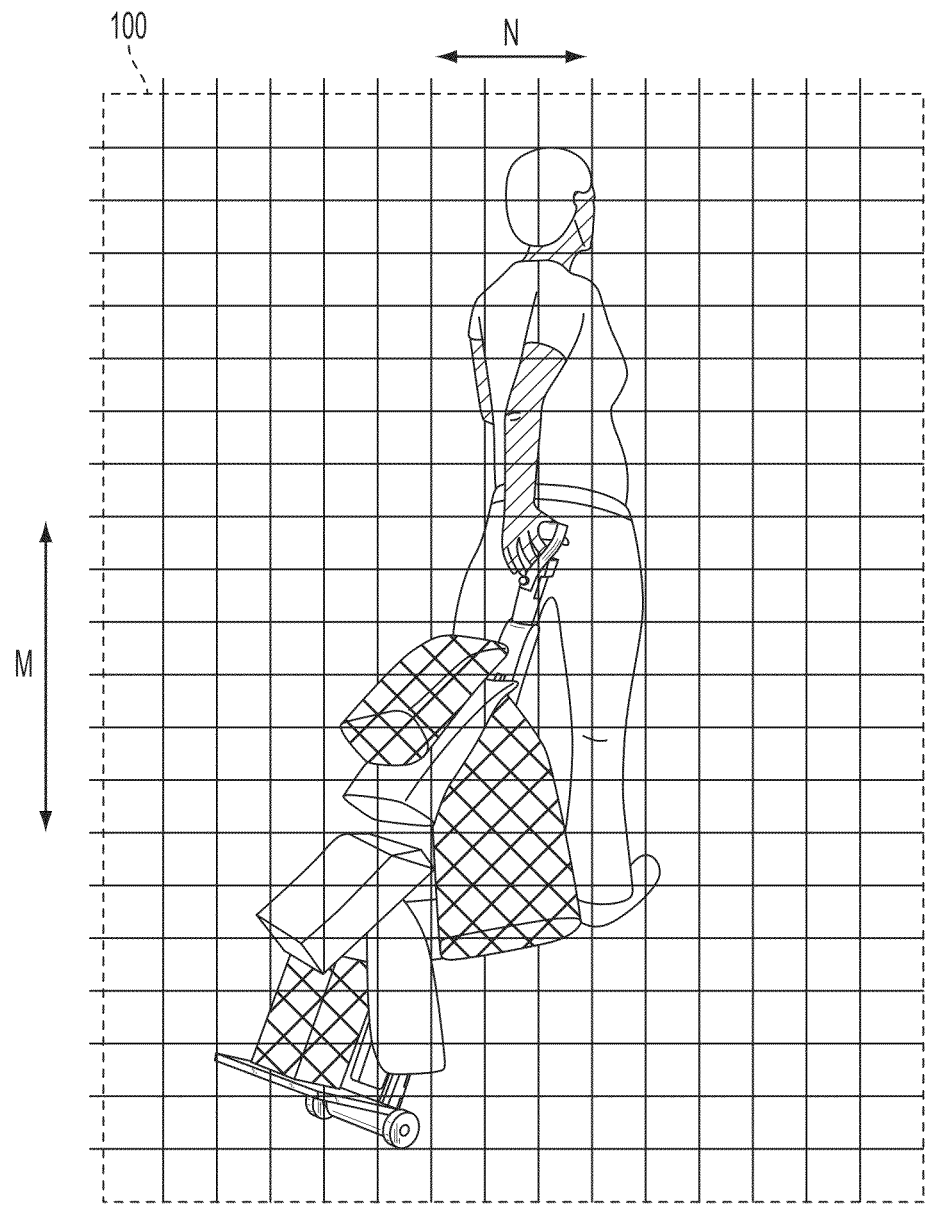
FIG. 8 shows the binary image of FIG. 1 divided into blocks of pixels.

At step 604, the image is divided into a plurality of blocks of pixels. Preferably, a size of any given block is selected based upon an estimated size of objects likely to be identified as comprising a material of interest within a field of view of the imaging system used to capture the source image. FIG. 8 shows the image of FIG. 1 divided into n×m blocks of substantial uniformity, where n≠m.

At step 606, a first block is selected for processing. Blocks may be selected for processing starting, for example, from a first row or column of the divided image and proceeding uniformly across rows and columns. Alternatively, the ordering of the blocks of pixels selected for processing is set by a user using, for instance, the graphical user interface of the computer workstation of FIG. 13.

At step 608, a density value is calculated for the current block using intensity values of pixels in this block. Methods for calculating density values are well established. In one embodiment, the density for a given block comprises the mean of intensity values of pixels within that block. Intensity values of pixels may be combined to generate a new intensity value for one or more pixels within the block prior to the density value being calculated.

At step 610, the block's density is compared to a threshold value. An example threshold density threshold value is 0.55. The threshold can be adjusted as needed depending on the number of classification errors in a given image.

At step 612, a determination is made whether the density for this block is greater than the threshold.

Figure 7:
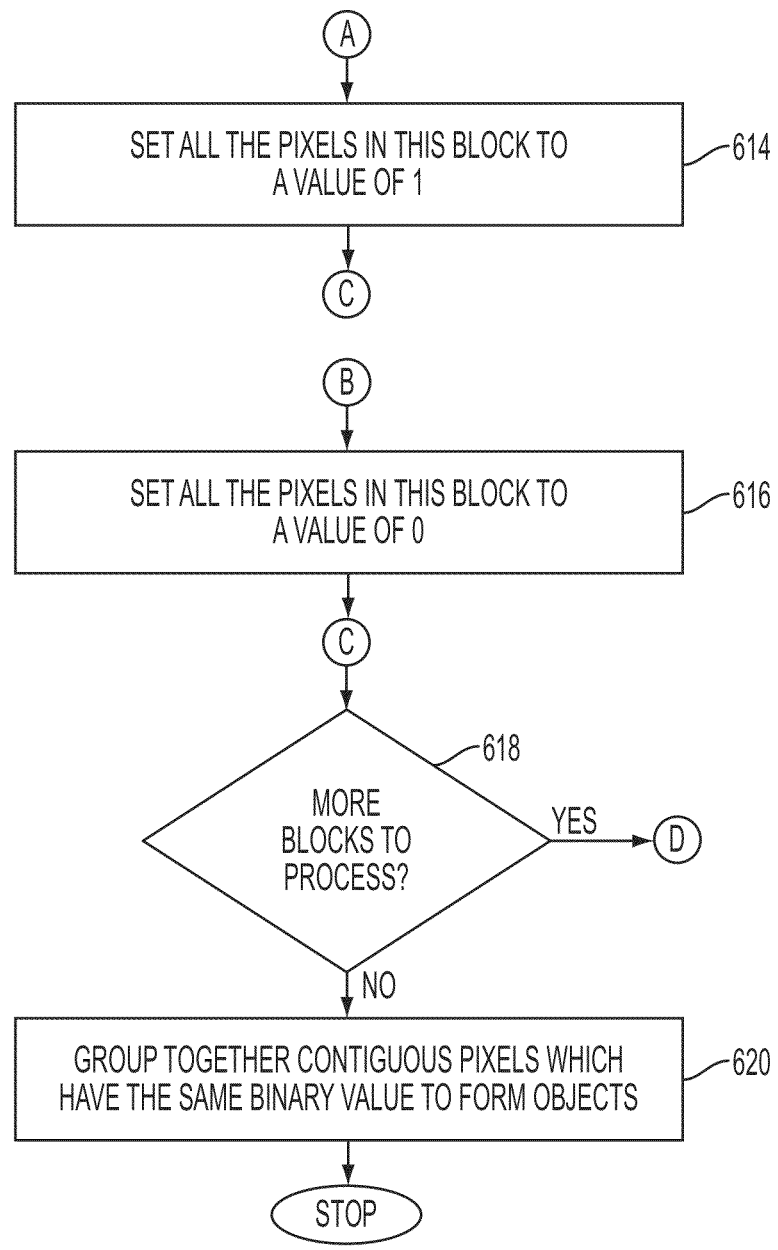
FIG. 7 is a continuation of the flow diagram of FIG. 6 with flow processing continuing with respect to nodes A or B.

Reference is now being made to the flow diagram of FIG. 7 which is a continuation of the flow diagram of FIG. 6 with flow processing continuing with respect to either of nodes A or B.

If, at step 612, the block's density is greater than the threshold then processing continues with respect to node A wherein, at step 614, all the pixels in this block are set to 1. Otherwise, processing continues with respect to node B wherein, at step 616, all the pixels in this block are set to 0. In either case, processing continues with respect to node C wherein, at step 618, a determination is made whether any more blocks remain to be processed. If so then processing continues with respect to node D wherein, at step 606, a next block of pixels is selected and processing continues in a similar manner for this next block. A density is calculated for this block based upon the intensity values of pixels within the block. This block's density is then compared to the threshold and the values of pixels in this block are manipulated accordingly such that pixels within the block all have the same binary value. Once all the blocks have been processed, then processing continues with respect to step 620.

At step 620, contiguously connected pixels having the same binary value are grouped together to form objects. Thereafter, in this embodiment, further processing stops. In another embodiment, the formed objects are counted. For example, if the material of interest is human tissue and the formed objects are thus human occupants in a motor vehicle, then by counting the number of objects the number of human occupants in the motor vehicle can be determined. Such an embodiment would find its uses in a vehicle occupancy detection system. In yet another embodiment, pixel intensity values are combined to generate a new intensity value for at least one pixel in a given block and the image post-processed accordingly.

It should be understood that the flow diagrams depicted herein are illustrative. One or more of the operations illustrated in the flow diagrams may be performed in a differing order. Other operations may be added, modified, enhanced, or consolidated. Variations thereof are intended to fall within the scope of the appended claims. All or portions of the flow diagrams may be implemented partially or fully in hardware in conjunction with machine readable program instructions.

Performance Results

Figure 9:
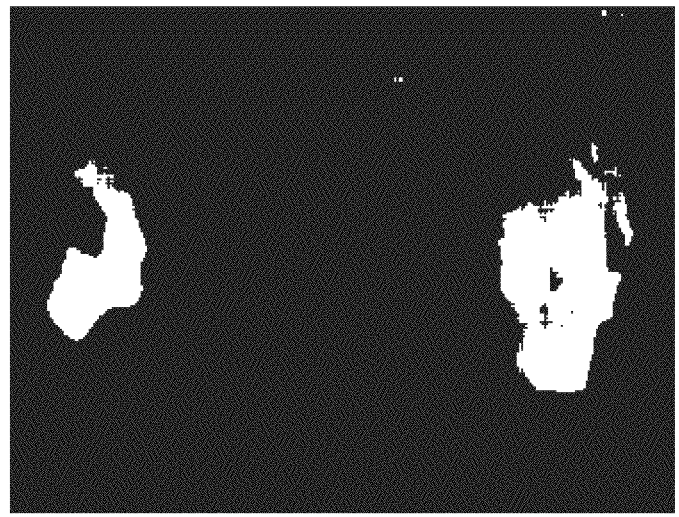
FIG. 9 shows a result of the present method applied to the image of FIG. 15.
Figure 15:
FIG. 15 is a prior art binary image comprising pixels which have been classified as human skin using the correlation method.

FIG. 9 shows the result of the present method applied to the binary image of FIG. 15 wherein pixels have been classified as to skin tissue. Notice that pixel classification errors have been reduced significantly when the pixel-classified image has been post-processed in accordance with the present method.

Figure 10:
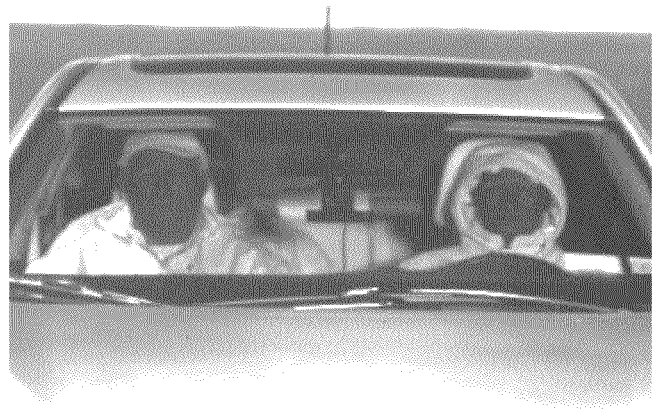
FIG. 10 shows an original IR image of two persons in the front passenger seat of a motor vehicle.
Figure 11:
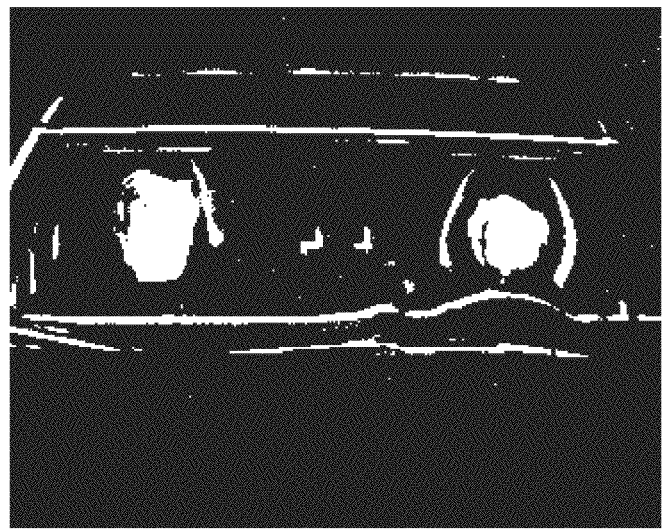
FIG. 11 is a binary version of the image of FIG. 10 wherein the pixels have been classified as to human tissue.
Figure 12:
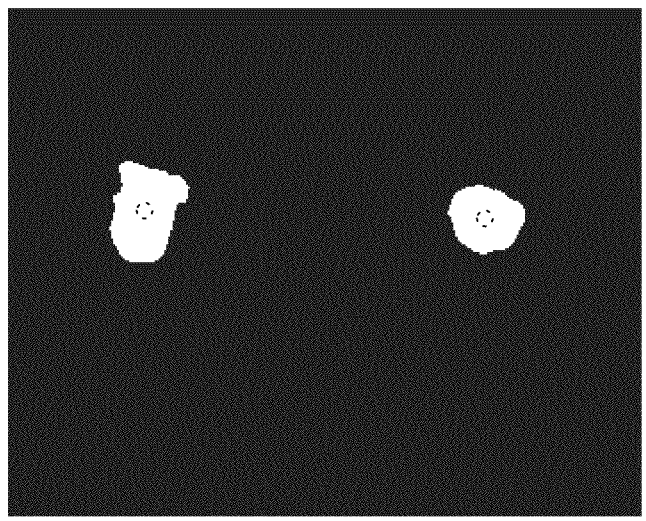
FIG. 12 shows a result of the present method applied to the image of FIG. 11.

FIG. 11 shows a binary version of the source image of FIG. 10 wherein pixels in the image having been classified as to skin tissue. FIG. 12 shows a result of the present method applied to the pixel-classified binary image of FIG. 11. Clearly, the number of pixel classification errors has been reduced significantly.

Block Diagram of Image Post-Processing System

Figure 13:
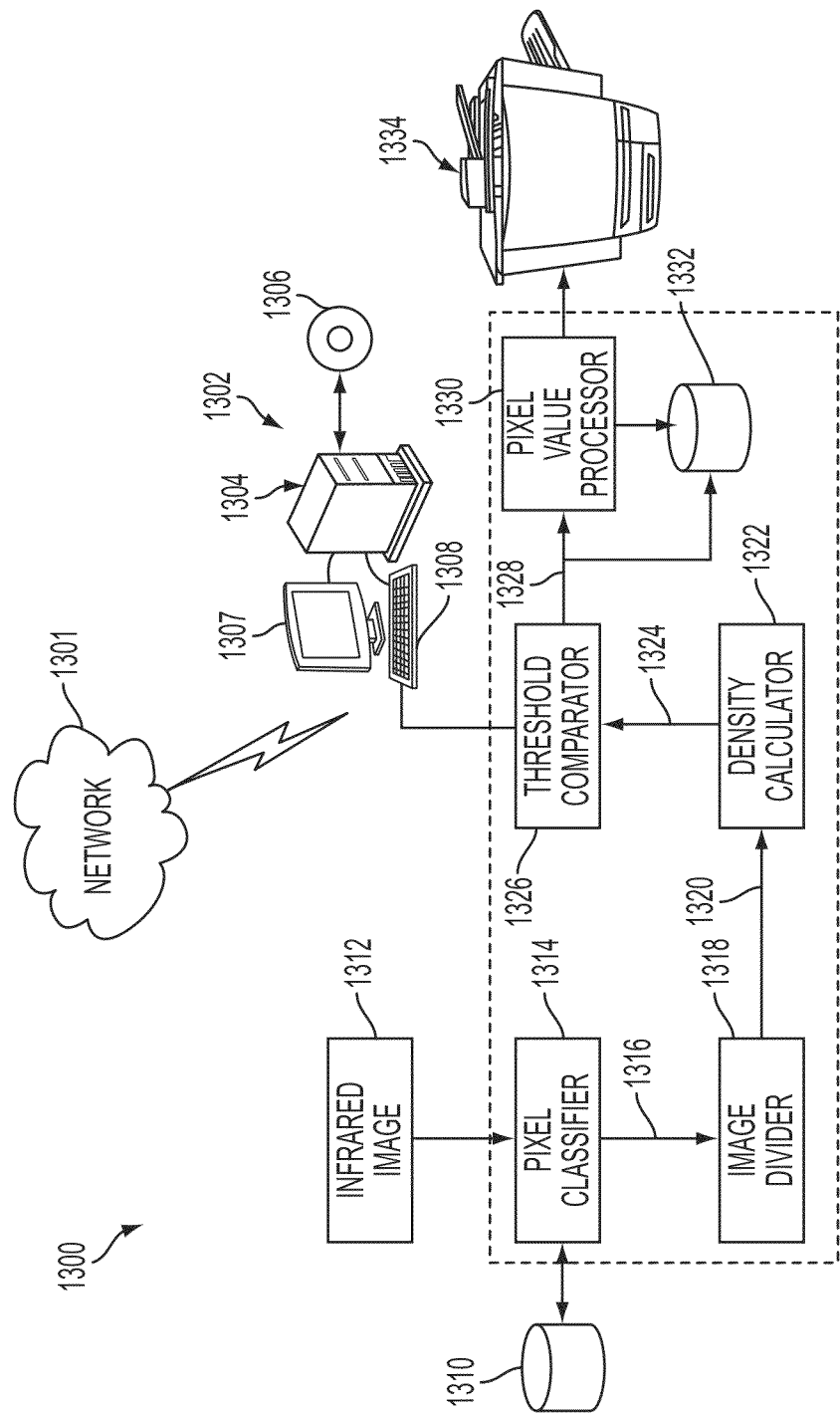
FIG. 13 is a block diagram of an example image post-processing system in accordance with the teachings hereof wherein various aspects of the present method, as described with respect to the flow diagrams of FIGS. 6 and 7, are performed.

Reference is now being made to FIG. 13 which illustrates a block diagram of an example image post-processing system wherein various aspects of the present post-processing method are performed in a manner as described with respect to the flow diagrams of FIGS. 6 and 7.

In FIG. 13, the post-processing system 1300 is shown comprising, in part, a networked computer workstation 1302 configured to perform any of the aspects of the present method. System 1302 includes a hard drive (internal to computer case 1304) which reads/writes to a machine readable media 1306 such as a floppy disk, optical disk, CD-ROM, DVC, magnetic tape, etc. Case 1304 houses a motherboard with a processor and memory, a communications link such as a network card, video card, and other software and hardware needed to perform the functionality of a computing system. The system further includes a graphical user interface comprising a display device 1307 such as a CRT, LCD, touchscreen, and the like, a keyboard 1308, and a mouse (not shown). Workstation 1302 has an operating system and other specialized software configured to display numeric values, text, scroll bars, dials, slideable menu bars, pull-down menus, selectable options, buttons, and the like, for entering, selecting, modifying, and accepting any information needed for processing. The embodiment shown is only illustrative and may include any other functionality which any display device known in the arts is capable of displaying. Software to configure a user interface or any portion thereof to display/enter/accept data is generally customizable. Default settings and initialization parameters can be retrieved from storage device 1310, as needed. Although shown as a desktop computer, it should be appreciated that workstation 1302 can be a laptop, a mainframe, a client/server, or a special purpose computer such as an ASIC, circuit board, dedicated processor, or the like.

Source image 1312 has been captured using a IR imaging system such as that which is described with respect to FIGS. 3 and 4. Pixel Classifier 1314 receives the source image and proceeds to classify pixels in that image with respect to materials of interest which have been pre-determined or otherwise identified by a user. Database 1310, which is in communication with Module 1314, may comprise a materials spectral database depending on the pixel classification method utilized. Values may be stored and/or retrieved from storage device 1310 as needed. Module 1314 outputs a pixel-classified binary image 1316. Image Divider 1318 receives the binary image and divides the image into blocks of pixels, and outputs divided image 1320. One example image which has been divided into a plurality of blocks of pixels is shown and discussed with respect to FIG. 8. Density Calculator 1322 receives the divided image and processes the blocks to determine, for each block, a density value based upon the intensity values of pixels within that block. Calculator 1322 outputs each block's respective density value 1324 to Threshold Comparator 1326. Comparator 1326 receives block density values and compares each block's density to a pre-determined threshold received from workstation 1302 having been provided by a user using, for example, the user interface thereof. Alternatively, the threshold is retrieved from storage device 1310. Each block may have a different threshold value. Comparator Module 1326 outputs, for each block, a signal 1328 which provides an indication to Pixel Value Processor 1330 to either set the values of the pixels in this block to one value in those instances where the block's density was less than threshold, or set the values of the pixels in this block to another value if density for this block was greater than the threshold. Block densities which happen to be identical to the threshold can be set either way depending on a user's preference. Pixel Processor 1330 writes the values of pixels in a block to memory device 1332 wherein the post-processed image is reassembled. In various embodiments hereof, Processor 1330 further processes the image by grouping together connected pixels having a same binary value to form objects and counting the number of formed objects in the image. The formed objects may be stored to device 1332. The image can then be provided to document reproduction device 1334 for rendering or communicated over network 1301 to a display device for subsequent viewing by a user or for further processing. It should be appreciated that some or all of the functionality described with respect to the modules and processors of FIG. 13 may be performed, in whole or in part, within workstation 1302. Workstation 1302 is capable of communicating with any number of remote systems over network 1301.

It should be appreciated that any of the modules and/or processors of FIG. 13 are in communication with workstation 1302 and with storage devices 1310 and 1332 via communication pathways (shown and not shown) and may store/retrieve data, parameter values, functions, pages, records, data, and machine readable/executable program instructions required to perform their various functions. Connections between modules includes both physical and logical connections. Each may further be in communication with one or more remote devices over network 1301. Connections between modules and processing units are intended to include both physical and logical connections. Various modules and processing units described with respect to the system of FIG. 13 may designate one or more components which may, in turn, comprise software and/or hardware designed to perform a specific function. A plurality of modules may perform a single function. A module may comprise a single piece of hardware such as an ASIC, electronic circuit, or special purpose processor. A plurality of modules may be executed by either a single special purpose computer system or a plurality of systems operating in parallel. Modules may include software/hardware modules which may comprise an operating system, drivers, controllers, and other apparatuses, some or all of which may be connected via network 1301.

Example Special Purpose Computer

Figure 14:
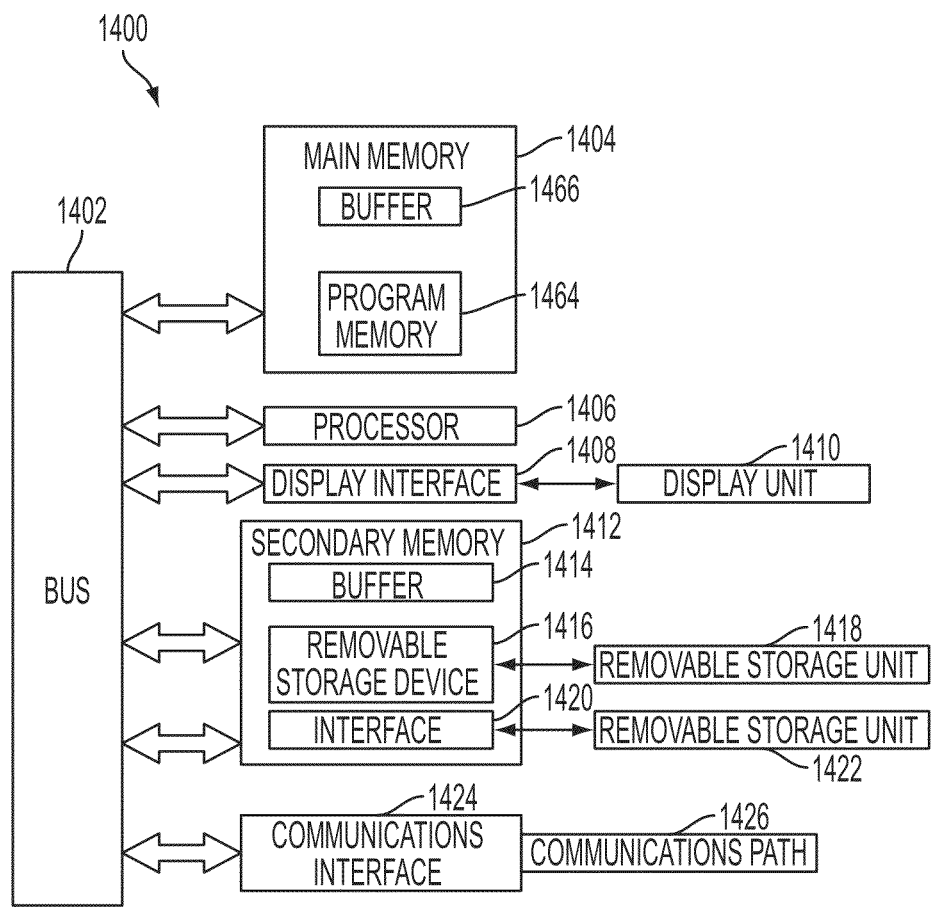
FIG. 14 illustrates a block diagram of one example special purpose computer for implementing various aspects of the present method described with respect to the flow diagrams of FIGS. 6 and 7 and the modules and processors of the block diagram of FIG. 13.

Reference is now being made to FIG. 14 which illustrates a block diagram of one example special purpose computer for implementing one or more aspects of the present method as described with respect to the flow diagrams of FIGS. 6 and 7, and the various modules and processing units of the block diagram of FIG. 13. Such a special purpose processor is capable of executing machine executable program instructions and may comprise any of a micro-processor, micro-controller, ASIC, electronic circuit, or any combination thereof.

Special purpose computer system 1400 includes processor 1406 for executing machine executable program instructions for carrying out all or some of the present method. The processor is in communication with bus 1402. The system includes main memory 1404 for storing machine readable instructions. Main memory may comprise random access memory (RAM) to support reprogramming and flexible data storage. Buffer 1466 stores data addressable by the processor. Program memory 1464 stores machine readable instructions for performing the present method. A display interface 1408 forwards data from bus 1402 to display 1410. Secondary memory 1412 includes a hard disk 1414 and storage device 1416 capable of reading/writing to removable storage unit 1418, such as a floppy disk, magnetic tape, optical disk, etc. Secondary memory 1412 may further include other mechanisms for allowing programs and/or machine executable instructions to be loaded onto the processor. Such mechanisms may include, for example, a storage unit 1422 adapted to exchange data through interface 1420 which enables the transfer of software and data. The system includes a communications interface 1424 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 1426 which carries such signals and may be implemented using wire, cable, fiber optic, phone line, cellular link, RF, memory, or other means known in the arts. The teachings hereof can be implemented in hardware or software using any known or later developed systems, structures, devices, and/or software by those skilled in the applicable art without undue experimentation from the functional description provided herein with a general knowledge of the relevant arts.

It is also contemplated that one or more aspects of the present method may be practiced in distributed computing environments where tasks are performed by remote processing devices that are linked through a communication network. In a distributed computing environment, program modules for performing various aspects of the present system and method. Other embodiments include a special purpose computer designed to perform the methods disclosed herein. The methods described can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be readily implemented as software executed on a programmed general purpose computer, a special purpose computer, a microprocessor, or the like.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described in the flow diagrams. Additionally, the article of manufacture may be included as part of an operating system, a plug-in, or may be shipped, sold, leased, or otherwise provided separately, either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art, which are also intended to be encompassed by the following claims. Accordingly, the embodiments set forth above are considered to be illustrative and not limiting. Changes to the above-described embodiments may be made without departing from the spirit and scope of the invention. The teachings of any printed publications including patents and patent applications, are each separately hereby incorporated by reference in their entirety.

What is claimed is:

1. A method for post-processing a pixel-classified binary image for determination of a number of objects in the image comprising a material of interest, the method comprising:
    receiving a binary image containing pixels which have been classified using a pixel classification method, each of said pixels has a binary value depending on whether said pixel was classified as a material of interest or not based on each pixel's original intensity value prior to classification;
    dividing said image into a plurality of blocks of pixels;
    manipulating pixel values in each of said blocks according to a threshold-based filtering criteria such that all pixels in a given block have a binary value which is uniform throughout the entire block;
    grouping together connected pixels having a same binary value to form objects; and
    counting the number of formed objects in said image.

2. The method of claim 1, wherein said pixel classification method comprises any of: a correlation method, a ratio method, and a best fitting reflectance method.

3. The method of claim 1, wherein manipulating pixel values according to said threshold-based filtering criteria comprises:
    for each of said blocks of pixels:
        calculating a density value for the current block using intensity values collected for pixels in this block;
        comparing said density to a pre-determined threshold value; and
        in response to said density being less than said threshold, setting all pixels in this block to 0, otherwise setting all pixels in this block to a non-zero value.

4. The method of claim 3, wherein calculating said density comprises determining a mean of pixel intensity values.

5. The method of claim 1, further comprising combining pixel intensity values to generate a new intensity value for at least one pixel in a given block.

6. The method of claim 1, wherein pixels of said image have been classified as to a material of interest being human tissue, and said formed objects are human occupants in a motor vehicle.

7. The method of claim 1, wherein all of said blocks have a substantially uniform size.

8. The method of claim 1, wherein a size of any given block is selected based upon an estimated size of objects likely to be identified as a material of interest within a field of view of an imaging system used to capture said image.

9. A system for post-processing a pixel-classified binary image for determination of a number of objects in the image comprising a material of interest, the system comprising:
    a memory and a storage device; and
    a processor in communication with said memory and storage device, said processor executing machine readable instructions for performing:
        receiving a binary image containing pixels which have been classified using a pixel classification method, each of said pixels has a binary value depending on whether said pixel was classified as a material of interest or not based on each pixel's original intensity value prior to classification;
        dividing said image into a plurality of blocks of pixels;
        manipulating pixel values in each of said blocks according to a threshold-based filtering criteria such that all pixels in a given block have a binary value which is uniform throughout the entire block; and
        grouping together connected pixels having a same binary value to form objects; and
        counting the number of formed objects in said image.

10. The system of claim 8, wherein said pixel classification method comprises any of: a correlation method, a ratio method, and a best fitting reflectance method.

11. The system of claim 8, wherein manipulating pixel values according to said threshold-based filtering criteria comprises:
    for each of said blocks of pixels:
        calculating a density value for the current block using intensity values collected for pixels in this block;
        comparing said density to a pre-determined threshold value; and
        in response to said density being less than said threshold, setting all pixels in this block to zero, otherwise setting all pixels in this block to a non-zero value.

12. The system of claim 11, wherein calculating said density comprises determining a mean of pixel intensity values.

13. The system of claim 11, further comprising combining pixel intensity values to generate a new intensity value for at least one pixel in a given block.

14. The system of claim 11, wherein pixels of said image have been classified as to a material of interest being human tissue, and said formed objects are human occupants in a motor vehicle.

15. The system of claim 11, wherein all of said blocks have a substantially uniform size.

16. The system of claim 11, wherein a size of any given block is selected based upon an estimated size of objects likely to be identified as a material of interest within a field of view of an imaging system used to capture said image.

17. A computer implemented method for post-processing a pixel-classified binary image for determination of a number of objects in the image comprising a material of interest, the method comprising:
    receiving a binary image containing pixels which have been classified using a pixel classification method, each of said pixels has a binary value depending on whether said pixel was classified as a material of interest or not based on each pixel's original intensity value prior to classification;
    dividing said image into a plurality of blocks of pixels;
    for each of said blocks:
        calculating a mean density value using intensity values of pixels in this block;
        comparing said mean density value to a pre-determined threshold; and
        in response to said density being less than said threshold, setting all pixels in this block to zero, otherwise setting all pixels in this block to a non-zero value; and grouping together connected pixels having a same binary value to form objects; and counting the number of formed objects in said image.

18. The computer implemented method of claim 17, further comprising combining pixel intensity values to generate a new intensity value for at least one pixel in a given block.

19. The computer implemented method of claim 17, wherein all of said blocks have a substantially uniform size.

20. The computer implemented method of claim 17, wherein pixels of said image have been classified as to a material of interest being human tissue, and said formed objects are human occupants in a motor vehicle.

21. The computer implemented method of claim 17, wherein a size of any given block is selected based upon an estimated size of objects likely to be identified as a material of interest within a field of view of an imaging system used to capture said image.

* * * * *